United States Patent
Kawasaki et al.

(10) Patent No.: US 8,383,220 B2
(45) Date of Patent: Feb. 26, 2013

(54) ACRYLIC RUBBER

(75) Inventors: Takashi Kawasaki, Ichihara (JP);
Kazuhiro Kobayashi, Ichihara (JP);
Tsutomu Kobari, Ichihara (JP);
Daisuke Shimiya, Ichihara (JP); Shogo Hagiwara, Ichihara (JP)

(73) Assignee: Denki Kagaku Kogyo Kabushiki Kaisha, Toyko (JP)

( * ) Notice: Subject to any disclaimer, the term of this patent is extended or adjusted under 35 U.S.C. 154(b) by 7 days.

(21) Appl. No.: 12/866,330

(22) PCT Filed: Feb. 4, 2009

(86) PCT No.: PCT/JP2009/051908
§ 371 (c)(1),
(2), (4) Date: Aug. 5, 2010

(87) PCT Pub. No.: WO2009/099113
PCT Pub. Date: Aug. 13, 2009

(65) Prior Publication Data
US 2010/0323141 A1  Dec. 23, 2010

(30) Foreign Application Priority Data
Feb. 5, 2008  (JP) .................................. 2008-024836

(51) Int. Cl.
*B29D 22/00* (2006.01)
*C08F 24/00* (2006.01)
*C08F 265/04* (2006.01)

(52) U.S. Cl. .................. 428/36.9; 428/36.8; 428/36.91; 428/36.92; 524/561; 524/439; 524/493; 524/556; 525/282; 525/292; 525/308; 525/309

(58) Field of Classification Search ................ 428/36.8, 428/36.9, 36.91, 36.92; 524/439, 493, 556, 524/561; 525/282, 292, 305, 308; 526/273, 526/319

See application file for complete search history.

(56) References Cited

U.S. PATENT DOCUMENTS

| | | | | |
|---|---|---|---|---|
| 6,380,318 | B1 * | 4/2002 | Saito et al. | 525/282 |
| 6,407,179 | B1 * | 6/2002 | Hagiwara et al. | 525/330.3 |
| 2004/0110905 | A1 * | 6/2004 | Kubota et al. | 525/329.7 |
| 2004/0249051 | A1 * | 12/2004 | Noda et al. | 524/495 |
| 2006/0167159 | A1 * | 7/2006 | Kubota et al. | 524/439 |

FOREIGN PATENT DOCUMENTS

| | | | |
|---|---|---|---|
| JP | 59 189109 | | 10/1984 |
| JP | 61 23614 | | 2/1986 |
| JP | 61023614 A | * | 2/1986 |
| JP | 7 196974 | | 8/1995 |
| JP | 10 231325 | | 9/1998 |
| JP | 2001 131236 | | 5/2001 |
| JP | 2006-36826 | | 2/2006 |
| JP | 2008 214418 | | 9/2008 |
| JP | 2008214418 A | * | 9/2008 |
| JP | 2009-7491 | | 1/2009 |

* cited by examiner

*Primary Examiner* — Michele L Jacobson
*Assistant Examiner* — Lee Sanderson
(74) *Attorney, Agent, or Firm* — Oblon, Spivak, McClelland, Maier & Neustadt, L.L.P.

(57) ABSTRACT

To provide an acrylic rubber composition having an excellent heat resistance, especially an excellent balance between the residual ratio of the tensile strength and the residual ratio of the elongation after heat aging, when formed into a vulcanized product, and a hose article, a sealing article and a rubber vibration insulator using the acrylic rubber composition.

An acrylic rubber composition containing an acrylic rubber obtainable by copolymerizing 100 parts by mass of an alkyl acrylate with from 10 to 100 parts by mass of an alkyl methacrylate and from 0.5 to 4 parts by mass of a crosslinkable monomer. Here, the alkyl methacrylate is preferably at least one compound selected from the group consisting of methyl methacrylate, ethyl methacrylate and n-butyl methacrylate, and the alkyl acrylate is preferably at least one compound selected from the group consisting of methyl acrylate, ethyl acrylate and n-butyl acrylate.

16 Claims, No Drawings

ACRYLIC RUBBER

TECHNICAL FIELD

The present invention relates to an acrylic rubber. More particularly, it relates to an acrylic rubber having heat resistance improved, and an acrylic rubber composition.

BACKGROUND ART

An acrylic rubber composition or its vulcanized product, which is excellent in physical properties such as heat resistance, oil resistance, mechanical properties and compression set, has been widely used as materials for a hose component, a sealing component and a rubber vibration insulator component, in an engine room of an automobile.

Along with exhaust emission controls, a trend toward higher output power of engines, etc. in recent years, these components are desired to have a higher heat resistance.

As an ethylene/acrylic rubber composition excellent in balance between cold resistance and heat resistance, an ethylene/acrylic rubber composition having a specific polytetramethylene glycol compound blended therein has been known (e.g. Patent Document 1).

Further, combined use with an antiozonant has also been known (e.g. Patent Document 2).

Patent Document 1: JP-A-2006-036826
Patent Document 2: JP-A-2009-007491

DISCLOSURE OF THE INVENTION

Object to be Accomplished by the Invention

The main object of the present invention is to provide an acrylic rubber composition and especially with little residual ratio of tensile strength and little change in elongation at break before and after heat aging, when formed into a vulcanized product, without impairing normal state physical properties, and its vulcanized product.

Here, the aforementioned heat aging means the heat aging resistance as disclosed in JIS K6257.

Means to Accomplish the Object

The present invention provides an acrylic rubber obtainable by copolymerizing 100 parts by mass of an alkyl acrylate with from 10 to 100 parts by mass of an alkyl methacrylate and from 0.5 to 4 parts by mass of a crosslinkable monomer.

The alkyl acrylate is preferably one comprising at least one compound selected from the group consisting of methyl acrylate, ethyl acrylate, n-butyl acrylate, isobutyl acrylate, n-pentyl acrylate, n-hexyl acrylate, n-octyl acrylate, 2-ethylhexyl acrylate, n-decyl acrylate, n-dodecyl acrylate, n-lauryl acrylate and n-octadecyl acrylate.

The alkyl methacrylate is preferably one comprising at least one compound selected from the group consisting of methyl methacrylate, ethyl methacrylate, n-butyl methacrylate, isobutyl methacrylate, n-pentyl methacrylate, n-hexyl methacrylate, n-octyl methacrylate, 2-ethylhexyl methacrylate, n-decyl methacrylate, n-dodecyl methacrylate, n-lauryl methacrylate and n-octadecyl methacrylate.

The crosslinkable monomer is preferably at least one compound selected from the group consisting of monobutyl butenoate and glycidyl methacrylate.

The above acrylic rubber is preferably one obtainable by further copolymerizing at most 10 parts by mass of an olefin monomer such as ethylene, per 100 parts by mass of the alkyl acrylate.

Further, the present invention provides an acrylic rubber composition containing the above acrylic rubber.

The acrylic rubber composition of the present invention preferably contains the above acrylic rubber, and at least one member selected from the group consisting of a vulcanizer, a vulcanization accelerator, a bulking agent, a reinforcing agent, a plasticizer, a lubricant, an antioxidant, a stabilizer and a silane coupling agent.

Further, the present invention relates to a vulcanized product obtainable by vulcanizing the above acrylic rubber composition, and a hose article, a sealing article and a rubber vibration insulator, comprising the vulcanized product.

Effect of the Invention

The acrylic rubber composition obtainable from the acrylic rubber of the present invention is useful as a hose article, a sealing article or a rubber vibration insulator, since when formed into a vulcanized product, the normal state physical properties are not impaired and especially the residual ratio of the tensile strength and the change in elongation at break before and after heat aging are little, when formed into a vulcanized product.

BEST MODE FOR CARRYING OUT THE INVENTION

The acrylic rubber of the present invention is obtainable by copolymerizing an alkyl acrylate, an alkyl methacrylate and a crosslinkable monomer.

Further, the acrylic rubber composition of the present invention contains an acrylic rubber, and at least one member selected from the group consisting of a vulcanizer, a vulcanization accelerator, a bulking agent, a reinforcing agent, a plasticizer, a lubricant, an antioxidant, a stabilizer and a silane coupling agent.

The alkyl acrylate serves as a skeleton of the acrylic rubber obtainable by polymerization, and by selecting its type, it is possible to adjust the basic properties such as normal state physical properties, cold resistance and oil resistance of the obtainable acrylic rubber composition.

The alkyl acrylate is not particularly limited, but it may, for example, be methyl acrylate, ethyl acrylate, n-propyl acrylate, n-butyl acrylate, isobutyl acrylate, n-pentyl acrylate, n-hexyl acrylate, n-octyl acrylate, 2-ethylhexyl acrylate, n-decyl acrylate, n-dodecyl acrylate, n-lauryl acrylate or n-octadecyl acrylate. They may be used alone or two or more of them may be used in combination. Among them, at least one member selected from the group consisting of methyl acrylate, ethyl acrylate and n-butyl acrylate is preferably used since it is possible to adjust the basic properties such as normal state physical properties, cold resistance and oil properties of the obtainable acrylic rubber composition. Further, by adjusting the amount of such a compound, it is possible to adjust e.g. cold resistance or oil resistance of the obtainable acrylic rubber composition and its vulcanized product.

For example, it is possible to improve cold resistance by increasing the copolymerization proportion of n-butyl acrylate, and it is possible to improve the oil resistance by increasing the copolymerization proportion of ethyl acrylate.

By the influence of hot air or the like, the main chain of the acrylic rubber is likely to be cut due to deterioration by oxidation, and the mechanical properties such as tensile strength and elongation at break are likely to be abruptly deteriorated. This phenomenon is generally called heat aging.

The alkyl methacrylate is used, by being copolymerized with the main chain of the acrylic rubber, to suppress the cutting of the main chain when the acrylic rubber is heat-aged, and thereby to maintain the mechanical strength such as tensile strength and elongation at break of the acrylic rubber.

The alkyl methacrylate may be used alone or two or more of them may be used in combination. By adjusting the amount of the alkyl methacrylate, it is possible to control suppression of the deterioration in the mechanical strength due to the cutting of the main chain of the obtainable acrylic rubber.

The alkyl methacrylate is not particularly limited, but it may, for example, be methyl methacrylate, ethyl methacrylate, n-butyl methacrylate, isobutyl methacrylate, n-pentyl methacrylate, n-hexyl methacrylate, n-octyl methacrylate, 2-ethylhexyl methacrylate, n-decyl methacrylate, n-dodecyl methacrylate, n-lauryl methacrylate or n-octadecyl methacrylate. Among them, at least one member selected from the group consisting of methyl methacrylate, ethyl methacrylate and n-butyl methacrylate is preferably used since it is possible to maintain the residual ratio of the tensile strength and the residual ratio of the elongation after the heat aging.

Further, the alkyl methacrylate can be copolymerized so as to impart the heat resistance.

The amount of the alkyl methacrylate is within a range of from 10 to 100 parts by mass, preferably from 10 to 80 parts by mass, per 100 parts by mass of the alkyl acrylate. If the amount of the alkyl methacrylate is at most 10 parts by mass, no effect to suppress cutting of the main chain of the acrylic rubber can be obtained, and deterioration of the mechanical properties cannot be suppressed. Further, if the amount exceeds 100 parts by mass, the acrylic rubber will be cured, whereby rubber elasticity will be impaired.

The crosslinkable monomer is one to be blended for crosslinking main chains of the acrylic rubber with one another when the acrylic rubber composition is formed into a vulcanized product.

The crosslinkable monomer may, for example, be one having an epoxy group, or one having an active chlorine group, a carboxy group or both of an epoxy group and a carboxy group.

The crosslinkable monomer is not particularly limited, but it may, for example, be one having an active chlorine group such as 2-chloroethyl vinyl ether, 2-chloroethyl acrylate, vinyl benzyl chloride, vinyl chloroacetate or allyl chloroacetate. Further, one containing a carboxy group such as acrylic acid, methacrylic acid, crotonic acid, 2-pentenoic acid, maleic acid, fumaric acid, itaconic acid, monobutyl butenoate or cinnamic acid may be mentioned. Further, one containing an epoxy group such as glycidyl acrylate, glycidyl methacrylate, allyl glycidyl ether or methallyl glycidyl ether may be mentioned.

Among the above compounds, mono-n-butyl butenoate is preferably used as the crosslinkable monomer having a carboxy group, and glycidyl methacrylate is preferably used as the crosslinkable monomer having an epoxy group, since it is possible to obtain an acrylic rubber and a vulcanized product of an acrylic rubber composition, of which the heat resistance is more improved as compared with a case where other compounds are used.

The amount of the crosslinkable monomer to be added is within a range of from 0.5 to 4 parts by mass per 100 parts by mass of the alkyl acrylate. If the amount of the crosslinkable monomer is less than 0.5 part by mass, the effect of crosslinking the acrylic rubber will be low, and the strength of a vulcanized product obtained from the acrylic rubber composition will be insufficient. If the amount exceeds 4 parts by mass, the vulcanized product obtained from the acrylic rubber composition will be cured, and the rubber elasticity will be impaired.

To the acrylic rubber, another monomer copolymerizable with the above monomers may be copolymerized within a range not to impair the purpose of the present invention.

Such another copolymerizable monomer is not particularly limited, but it may, for example, be an alkyl vinyl ketone such as methyl vinyl ketone; a vinyl or allyl ether, such as vinyl ethyl ether or allyl methyl ether; a vinyl aromatic compound such as styrene, α-methyl styrene, chlorostyrene, vinyl toluene or vinyl naphthalene; a vinylnitrile such as acrylonitrile or methacrylonitrile; or an ethylenically unsaturated compound such as acrylamide, propylene, butadiene, isoprene, pentadiene, vinyl acetate, vinyl chloride, vinylidene chloride, vinyl fluoride, vinylidene fluoride, ethylene or vinyl propionate.

Especially, in a case where ethylene or propylene is copolymerized to prepare the acrylic rubber, its amount is preferably at most 10 parts by mass per 100 parts by mass of the alkyl acrylate. By copolymerizing ethylene or propylene, it is possible to obtain an acrylic rubber of which cold resistance is improved.

The acrylic rubber of the present invention is one obtainable by copolymerizing the above monomers by a known method such as emulsion polymerization, suspension polymerization, solution polymerization or bulk polymerization.

To the acrylic rubber composition of the present invention, a vulcanizer or a vulcanization accelerator may be further added to carry out vulcanization, thereby to prepare a vulcanized rubber (also referred to as a vulcanized product).

The vulcanizer is not particularly limited so long as it is one commonly used for vulcanization of the acrylic rubber composition. For example, in a case where a monomer having a carboxy group is used as a crosslinkable monomer, a polyamine compound is suitable as the vulcanizer, and particularly a vulcanized compound having a guanidine compound added thereto is suitably used. Further, in a case where a monomer having an epoxy group is used as a crosslinkable monomer, an imidazole compound is suitably used as the vulcanizer.

The above polyamine compound may, for example, be an aromatic polyamine compound such as 4,4'-bis(4-aminophenoxy)biphenyl, 4,4'-diaminodiphenyl sulfide, 1,3-bis(4-aminophenoxy)-2,2-dimethylpropane, 1,3-bis(4-aminophenoxy)benzene, 1,4-bis(4-aminophenoxy)benzene, 1,4-bis(4-aminophenoxy)pentane, 2,2-bis[4-(4-aminophenoxy)phenyl]propane, 2,2-bis[4-(4-aminophenoxy)phenyl]sulfone, 4,4'-diaminodiphenyl sulfone, bis(4-3-aminophenoxy)phenyl sulfone, 2,2-bis[4-(4-aminophenoxy)phenyl]hexafluoropropane, 3,4'-diamino diphenyl ether, 4,4'-diamino diphenyl ether, 4,4'-diaminobenzanilide or bis[4-(4-aminophenoxy)phenyl]sulfone; or an aliphatic polyamine compound such as hexamethylenediamine, hexamethylenediamine carbamate, N,N'-dicinnamylidene-1,6-hexanediamine, diethylenetriamine, triethylenetetramine or tetraethylenepentamine.

Further, the guanidine compound may, for example, be guanidine, tetramethylguanidine, dibutylguanidine, diphenylguanidine or di-o-tolylguanidine.

The imidazole compound may, for example, be 1-methylimidazole, 1,2-dimethylimidazole, 1-methyl-2-ethylimidazole, 1-benzyl-2-methylimidazole, 1-benzyl-2-ethylimidazole, 1-benzyl-2-ethyl-5-methylimidazole, 1-benzyl-2-phenylimidazole, 1-benzyl-2-phenylimidazole trimellitate, 1-aminoethylimidazole, 1-aminoethyl-2-methylimidazole, 1-aminoethyl-2-ethylimidazole, 1-cyanoethyl-2-methylimidazole, 1-cyanoethyl-2-phenylimidazole, 1-cyanoethyl-2- ethyl-4-methylimidazole, 1-cyanoethyl-2-undecylimidazole, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecylimidazole trimellitate, 2,4-diamino-6-[2'-methylimidazolyl-(1)']ethyl-s-triazine/isocyanuric acid adduct, 1-cyanoethyl-2-phenyl-4,5-di-(cyanoethoxymethyl)imidazole, N-(2-methylimidazolyl-1-ethyl)urea, N,N'-bis-(2-methylimidazolyl-1-ethyl)urea, 1-(cyanoethylaminoethyl)-2-methylimidazole, N,N'-[2-methylimidazolyl-(1)-ethyl]adipoyldiamide, N,N'-[2-methylimidazolyl-(1)-ethyl]-dodecane dioyldiamide, N,N'-[2-methylimidazolyl-(1)-ethy]-eicosane dioyldiamide, 2,4-diamino-6-[2'-methylimidazolyl-(1)']-ethyl-s-triazine, 2,4-diamino-6-[2'-undecylimidazolyl-(1)']-ethyl-s-triazine, 1-dodecyl-2-methyl-3-benzylimidazolium chloride or 1,3-dibenzyl-2-methylimidazolium chloride.

The amount of the vulcanizer to be added is not particularly limited, but is preferably from 0.1 to 10 parts by mass, more preferably from 0.3 to 5 parts by mass, per 100 parts by mass of the acrylic rubber. When the amount is within this range, it is possible to carry out the required sufficient vulcanization treatment.

The vulcanization accelerator is added for adjusting the vulcanization rate. The vulcanization accelerator is not particularly limited, but it may specifically be a curing agent for an epoxy resin, such as a thermally decomposed ammonium salt, an organic acid, an acid anhydride, an amine, sulfur or a sulfur compound. As the amount of the vulcanization accelerator, it may be added within a range not to deteriorate the properties of a vulcanized product obtainable from the acrylic rubber composition of the present invention.

The vulcanized product of the acrylic rubber composition of the present invention is one obtainable by kneading the acrylic rubber composition, the vulcanizer, the vulcanization accelerator and the like at a temperature of not higher than the vulcanization temperature.

The acrylic rubber composition of the present invention may be formed into a desired various shape, followed by vulcanization to obtain a vulcanized product, or it may be vulcanized and then formed into various shapes. The vulcanization temperature may suitably be set depending upon the formulation of respective components in the acrylic rubber composition or the type of the vulcanizer, and it is usually from 100 to 200° C., preferably from 130 to 180° C. Further, the time required for vulcanization is from 1 to 10 hours, preferably from 2 to 6 hours.

As an apparatus to knead, form or vulcanize the acrylic rubber composition of the present invention, and as an apparatus to knead or form the vulcanized product of the acrylic rubber composition, one commonly used in the rubber industry may be used.

The acrylic rubber composition of the present invention may contain the above acrylic rubber, and at least one member selected from the group consisting of a bulking agent, a reinforcing agent, a plasticizer, a lubricant, an antioxidant, a stabilizer and a silane coupling agent, depending upon the purpose of use at the practical use.

As the bulking agent and the reinforcing agent, a bulking agent and a reinforcing agent which are usually used for a rubber may be added, and they may, for example, be carbon black, silica, clay, talc or calcium carbonate. The amount of such additives is, in total, preferably from 20 to 100 parts by mass, per 100 parts by mass of the acrylic rubber.

As the plasticizer, plasticizers which are usually used for a rubber may be used, and an ester plasticizer, a polyoxyethylene ether plasticizer, a trimellitate plasticizer may, for example, be mentioned. The amount of the plasticizer is preferably up to about 50 parts by mass, per 100 parts by mass of the acrylic rubber.

The acrylic rubber composition and its vulcanized product of the present invention are suitably used, particularly, for rubber hoses, sealing articles such as gaskets and packings, and rubber vibration insulators.

The rubber hose may, for example, be a transmission oil cooler hose, an engine oil cooler hose, an air duct hose, a turbo intercooler hose, a hot air hose, a radiator hose, a power steering hose, a hose for fuel systems or a hose for drain systems, for automobiles, construction machines or hydraulic equipments.

The structure of a rubber hose may be not only a single layered hose obtained from the acrylic rubber composition and its vulcanized product, but also a multilayered hose wherein, for example, a fluororubber, a fluorine-modified acrylic rubber, a hydrin rubber, a nitrile rubber, a hydrogenated nitrile rubber, a chloroprene rubber, an ethylene/propylene rubber, a silicone rubber or a chlorosulfonated polyethylene rubber is combined as an inner layer, an interlayer or an outer layer, with a layer comprising the acrylic rubber composition and its vulcanized product.

Further, it is also possible to provide an intermediate or outermost layer of the rubber hose with a reinforcing fiber or wire, as is generally commonly carried out.

The sealing article may, for example, be an engine head cover gasket, an oil pan gasket, an oil seal, a lip seal packing, an O-ring, a transmission seal gasket, a crankshaft, a camshaft seal gasket, a valve stem, a power steering seal, a belt cover seal, a boot material for constant velocity joints or a boot material for rack and pinion.

The rubber vibration insulator may, for example, be a damper pulley, a center support cushion or a suspension bush.

EXAMPLES

Now, the present invention will be described in further detail with reference to Examples, but it should be understood that the present invention is by no means restricted thereto.

Preparation of Acrylic Rubber

Example 1

Into a reaction vessel having an internal capacity of 40 liters, 120 g of glycidyl methacrylate, 17 kg of an aqueous solution containing 4 parts by mass of partially saponified polyvinyl alcohol, and 22 g of sodium acetate were introduced and preliminarily thoroughly mixed by a stirrer to prepare a uniform suspension. The air at the upper portion in the vessel was replaced with nitrogen, the interior of the vessel was maintained at 55° C., and from a separate inlet, 6.16 kg of ethyl acrylate, 3.92 kg of n-butyl acrylate, 1.12 kg of methyl methacrylate and 2.9 kg of an aqueous t-butyl hydroperoxide solution (0.25 mass % aqueous solution) were separately injected to initiate the polymerization. The internal temperature was maintained at 55° C. during the reaction, and the reaction was completed in 6 hours. 10 kg of an aqueous sodium borate solution (3 mass % aqueous solution) was added to the formed polymer solution to solidify the polymer, followed by dehydration and drying to obtain an acrylic rubber. The acrylic rubber had a copolymer composition comprising, as monomer units, 1.2 parts by mass of glycidyl methacrylate, 61.1 parts by mass of ethyl acrylate, 38.9 parts by mass of n-butyl acrylate and 11.1 parts by mass of methyl methacrylate.

The monomer units derived from the respective monomers were quantitatively determined by measuring nuclear magnetic resonance spectrum of the obtained polymer.

Example 2

An acrylic rubber was prepared in the same manner as in Example 1 except that the injection amount of ethyl acrylate was changed to 2.24 kg, the injection amount of n-butyl acrylate was changed to 6.72 kg, and the injection amount of methyl methacrylate was changed to 2.24 kg. The acrylic rubber had a copolymer composition comprising, as monomer units, 1.4 parts by mass of glycidyl methacrylate, 25.0 parts by mass of ethyl acrylate, 75.0 parts by mass of n-butyl acrylate and 25.0 parts by mass of methyl methacrylate.

Example 3

Into a pressure resistant reaction vessel having an internal capacity of 40 liters, 120 g of glycidyl methacrylate, 17 kg of an aqueous solution containing 4 parts by mass of partially saponified polyvinyl alcohol, and 22 g of sodium acetate were introduced and preliminarily thoroughly mixed by a stirrer to prepare a uniform suspension. The air at the upper portion in the vessel was replaced with nitrogen, then ethylene was injected to the upper portion in the vessel to adjust the pressure to 35 kg/cm$^2$. Stirring was continued and the interior was maintained at 55° C., and then from a separate inlet, 6.16 kg of ethyl acrylate, 3.92 kg of n-butyl acrylate, 1.12 kg of methyl methacrylate and 3.1 kg of an aqueous t-butyl hydroperoxide solution (0.25 mass % aqueous solution) were separately injected to initiate the polymerization. The internal temperature was maintained at 55° C. during the reaction, and the reaction was completed in 6 hours. 10 kg of an aqueous sodium borate solution (3 mass % aqueous solution) was added to the formed polymer solution to solidify the polymer, followed by dehydration and drying to obtain an acrylic rubber. The acrylic rubber had a copolymer composition comprising, as monomer units, 5.6 parts by mass of ethylene, 1.2 parts by mass of glycidyl methacrylate, 61.1 parts by mass of ethyl acrylate, 38.9 parts by mass of n-butyl acrylate and 11.1 parts by mass of methyl methacrylate.

Example 4

An acrylic rubber was prepared in the same manner as in Example 1 except that no methyl methacrylate was introduced, and 1.12 kg of ethyl methacrylate was introduced. The acrylic rubber had a copolymer composition comprising, as monomer units, 1.2 parts by mass of glycidyl methacrylate, 61.1 parts by mass of ethyl acrylate, 38.9 parts by mass of n-butyl acrylate and 11.1 parts by mass of ethyl methacrylate.

Example 5

An acrylic rubber was prepared in the same manner as in Example 1 except that no ethyl acrylate and no methyl methacrylate were introduced, and 8.06 kg of n-butyl acrylate and 3.14 kg of ethyl methacrylate were introduced. The acrylic rubber had a copolymer composition comprising, as monomer units, 1.5 parts by mass of glycidyl methacrylate, 100.0 parts by mass of n-butyl acrylate and 38.9 parts by mass of ethyl methacrylate.

Example 6

An acrylic rubber was prepared in the same manner as in Example 3 except that no methyl methacrylate was introduced and 1.12 kg of ethyl methacrylate was introduced. The acrylic rubber had a copolymer composition comprising, as monomer units, 5.6 parts by mass of ethylene, 1.2 parts by mass of glycidyl methacrylate, 61.1 parts by mass of ethyl acrylate, 38.9 parts by mass of n-butyl acrylate and 11.1 parts by mass of ethyl methacrylate.

Example 7

An acrylic rubber was prepared in the same manner as in Example 1 except that no methyl methacrylate was introduced, and 1.12 kg of n-butyl methacrylate, 7.84 kg of ethyl acrylate and 2.24 kg of n-butyl acrylate were introduced. The acrylic rubber had a copolymer composition comprising, as monomer units, 1.2 parts by mass of glycidyl methacrylate, 77.8 parts by mass of ethyl acrylate, 22.2 parts by mass of n-butyl acrylate and 11.1 parts by mass of n-butyl methacrylate.

Example 8

An acrylic rubber was prepared in the same manner as in Example 1 except that no ethyl acrylate and no methyl methacrylate were introduced, and 6.50 kg of n-butyl acrylate and 4.70 kg of n-butyl methacrylate were introduced. The acrylic rubber had a copolymer composition comprising, as monomer units, 1.9 parts by mass of glycidyl methacrylate, 100.0 parts by mass of n-butyl acrylate and 72.4 parts by mass of n-butyl methacrylate.

Example 9

An acrylic rubber was prepared in the same manner as in Example 3 except that no methyl methacrylate was introduced, and 1.12 kg of n-butyl methacrylate, 7.84 kg of ethyl acrylate and 2.24 kg of n-butyl acrylate were introduced. The acrylic rubber had a polymer composition comprising, as monomer units, 5.6 parts by mass of ethylene, 1.2 parts by mass of glycidyl methacrylate, 77.8 parts by mass of ethyl acrylate, 22.2 parts by mass of n-butyl acrylate and 11.1 parts by mass of n-butyl methacrylate.

Example 10

An acrylic rubber was prepared in the same manner as in Example 1 except that no ethyl acrylate was introduced, and 3.36 kg of methyl acrylate and 6.72 kg of n-butyl acrylate were introduced. The acrylic rubber had a copolymer composition comprising, as monomer units, 1.2 parts by mass of glycidyl methacrylate, 33.3 parts by mass of methyl acrylate, 66.7 parts by mass of n-butyl acrylate and 11.1 parts by mass of methyl methacrylate.

Example 11

An acrylic rubber was prepared in the same manner as in Example 1 except that no ethyl acrylate and no methyl methacrylate were introduced, and 1.68 kg of methyl acrylate, 7.28 kg of n-butyl acrylate and 2.24 kg of ethyl methacrylate were introduced. The acrylic rubber had a copolymer composition comprising, as monomer units, 1.4 parts by mass of glycidyl methacrylate, 18.8 parts by mass of methyl acrylate, 81.3 parts by mass of n-butyl acrylate and 25.0 parts by mass of ethyl methacrylate.

Example 12

An acrylic rubber was prepared in the same manner as in Example 1 except that no ethyl acrylate and no methyl acrylate were introduced, and 2.80 kg of methyl acrylate, 6.16 kg of n-butyl acrylate and 2.24 kg of n-butyl methacrylate were introduced. The acrylic rubber had a copolymer composition comprising, as monomer units, 1.4 parts by mass of glycidyl methacrylate, 31.3 parts by mass of methyl acrylate, 68.8 parts by mass of n-butyl acrylate and 25.0 parts by mass of n-butyl methacrylate.

Example 13

An acrylic rubber was prepared in the same manner as in Example 3 except that ethylene was injected to the upper portion in the vessel to adjust the pressure to 45 kg/cm². The acrylic rubber had a copolymer composition comprising, as monomer units, 8.9 parts by mass of ethylene, 1.2 parts by mass of glycidyl methacrylate, 61.1 parts by mass of ethyl acrylate, 38.9 parts by mass of n-butyl acrylate and 11.1 parts by mass of methyl methacrylate.

Example 14

An acrylic rubber was prepared in the same manner as in Example 3 except that ethylene was injected to the upper portion in the vessel to adjust the pressure to 55 kg/cm². The acrylic rubber had a copolymer composition comprising, as monomer units, 11.1 parts by mass of ethylene, 1.2 parts by mass of glycidyl methacrylate, 61.1 parts by mass of ethyl acrylate, 38.9 parts by mass of n-butyl acrylate and 11.1 parts by mass of methyl methacrylate.

Comparative Example 1

An acrylic rubber was prepared in the same manner as in Example 1 except that no methyl methacrylate was injected, and 7.84 kg of ethyl acrylate and 3.36 kg of n-butyl acrylate were injected. The acrylic rubber had a copolymer composition comprising, as monomer units, 1.1 parts by mass of glycidyl methacrylate, 70.0 parts by mass of ethyl acrylate and 30.0 parts by mass of n-butyl acrylate.

Comparative Example 2

An acrylic rubber was prepared in the same manner as in Example 1 except that no methyl methacrylate was introduced, and 5.60 kg of ethyl acrylate and 5.60 kg of n-butyl acrylate were introduced. The acrylic rubber had a copolymer composition comprising, as monomer units, 1.1 parts by mass of glycidyl methacrylate, 50.0 parts by mass of ethyl acrylate and 50.0 parts by mass of n-butyl acrylate.

Comparative Example 3

An acrylic rubber was prepared in the same manner as in Example 1 except that no ethyl acrylate was introduced, and 5.04 kg of n-butyl acrylate and 6.16 kg of methyl methacrylate were introduced. The acrylic rubber had a copolymer composition comprising, as monomer units, 2.4 parts by mass of glycidyl methacrylate, 100.0 parts by mass of n-butyl acrylate and 122.2 parts by mass of methyl methacrylate.

Comparative Example 4

An acrylic rubber was prepared in the same manner as in Example 1 except that no ethyl acrylate was introduced, and 10.27 kg of n-butyl acrylate and 0.93 kg of methyl methacrylate were introduced. The acrylic rubber had a copolymer composition comprising, as monomer units, 1.2 parts by mass of glycidyl methacrylate, 100.0 parts by mass of n-butyl acrylate and 9.1 parts by mass of methyl methacrylate.

Comparative Example 5

An acrylic rubber was prepared in the same manner as in Example 1 except that 0.45 kg of glycidyl methacrylate was introduced. The acrylic rubber had a copolymer composition comprising, as monomer units, 4.4 parts by mass of glycidyl methacrylate, 61.1 parts by mass of ethyl acrylate, 38.9 parts by mass of n-butyl acrylate and 11.1 parts by mass of methyl methacrylate.

Comparative Example 6

An acrylic rubber was prepared in the same manner as in Example 1 except that 0.03 kg of glycidyl methacrylate was introduced. The acrylic rubber had a copolymer composition comprising, as monomer units, 0.3 part by mass of glycidyl methacrylate, 61.1 parts by mass of ethyl acrylate, 38.9 parts by mass of n-butyl acrylate and 11.1 parts by mass of methyl methacrylate.

The acrylic rubber obtained in each of the above Examples and Comparative Examples was kneaded with respective materials shown in Tables 1 to 3 by using an 8-inch open roll to obtain an acrylic rubber composition.

In each of Examples and Comparative Examples, octadecyltrimethylammonium bromide, trimethylthiourea and 1-benzyl-2-methylimidazole were used as a vulcanizer.

Further, SEAST 116 manufactured by Tokai Carbon Co., Ltd. was employed as carbon black as a bulking agent, HICALL K-230 manufactured by KANEDA Co., Ltd. was employed as liquid paraffin as a lubricant, and Farmin 80 manufactured by Kao Corporation was employed as stearylamine as a lubricant. Further, Naugard 445 manufactured by SHIRAISHI CALCIUM KAISHA, LTD. was employed as an antioxidant, and LUNAC S-90 manufactured by Kao Corporation was employed as stearic acid as a lubricant. As other reagents, commercial products were employed.

The acrylic rubber composition was subjected to heat treatment at 170° C. for 20 minutes using a steam heating type hot press, to obtain a primary vulcanized product, which was then subjected to heat treatment at 170° C. in a hot air (in a gear oven) for 4 hours to obtain a vulcanized product of the acrylic rubber composition.

The obtained vulcanized product of the acrylic rubber composition was evaluated with respect to the tensile strength, the elongation at break, hardness, cold resistance and heat aging resistance under the following conditions.

(1) Tensile Strength/Elongation at Break

Measurement was carried out in accordance with JIS K6251.

(2) Hardness

Measurement was carried out by using a durometer in accordance with JIS K6253.

(3) Cold Resistance Test

The temperature $T_{100}$ was measured in accordance with JIS K6261. Here, $T_{100}$ is a temperature at which the relative modulus of the vulcanized product becomes 100 times the modulus at 23° C.

(4) Heat Aging Resistance Test

In accordance with JIS K6257, tensile strength and elongation at break of a test specimen subjected to heat treatment at 190° C. for 288 hours were measured. When the residual ratio of the tensile strength and the residual ratio of the elongation at break are high under such evaluation conditions, the heat resistance is considered to be excellent.

Further, the respective residual ratios were obtained by the formula (Equation 1). The closer the value of the residual ratio to 100, the smaller the change before and after the heat resistance test and the better the heat aging resistance is.

$$A_R(\text{residual ratio}) \% = \frac{\text{Measurement value after heat treatment}}{\text{Measurement value before heat treatment}} \times 100 \quad \text{(Equation 1)}$$

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
| Methyl acrylate |  | Parts by mass | 0.0 | 0.0 | 0.0 | 0.0 | 0.0 | 0.0 | 0.0 |
| Ethyl acrylate |  | Parts by mass | 61.1 | 25.0 | 61.1 | 61.1 | 0.0 | 61.1 | 77.8 |
| n-Butyl acrylate |  | Parts by mass | 38.9 | 75.0 | 38.9 | 38.9 | 100.0 | 38.9 | 22.2 |
| Methyl methacrylate |  | Parts by mass | 11.1 | 25.0 | 11.1 | 0.0 | 0.0 | 0.0 | 0.0 |
| Ethyl methacrylate |  | Parts by mass | 0.0 | 0.0 | 0.0 | 11.1 | 38.9 | 11.1 | 0.0 |
| n-Butyl methacrylate |  | Parts by mass | 0.0 | 0.0 | 0.0 | 0.0 | 0.0 | 0.0 | 11.1 |
| Ethylene |  | Parts by mass | 0.0 | 0.0 | 5.6 | 0.0 | 0.0 | 5.6 | 0.0 |
| Glycidyl methacrylate |  | Parts by mass | 1.2 | 1.4 | 1.2 | 1.2 | 1.5 | 1.2 | 1.2 |
| Acrylic rubber |  |  | 100 | 100 | 100 | 100 | 100 | 100 | 100 |
| Stearic acid |  |  | 1 | 1 | 1 | 1 | 1 | 1 | 1 |
| Naugard 445 |  |  | 1 | 1 | 1 | 1 | 1 | 1 | 1 |
| SEAST #116 |  |  | 50 | 50 | 50 | 50 | 50 | 50 | 50 |
| Liquid paraffin |  |  | 1 | 1 | 1 | 1 | 1 | 1 | 1 |
| Trimethylthiourea |  |  | 0.5 | 0.5 | 0.5 | 0.5 | 0.5 | 0.5 | 0.5 |
| 1-Benzyl-2-methylimidazole |  |  | 1.6 | 1.6 | 1.6 | 1.6 | 1.6 | 1.6 | 1.6 |
| Octadecyltrimethyl ammonium bromide |  |  | 0.5 | 0.5 | 0.5 | 0.5 | 0.5 | 0.5 | 0.5 |
| Normal state physical properties Secondary vulcanized product | Tensile stress at 100% elongation | MPa | 4.7 | 4.9 | 4.7 | 3.9 | 3.5 | 4.0 | 4.1 |
|  | Tensile strength | MPa | 14.3 | 13.3 | 14.5 | 12.8 | 9.4 | 13.2 | 13.6 |
|  | Elongation at break | % | 280 | 243 | 270 | 281 | 304 | 276 | 272 |
|  | Hardness |  | 65 | 66 | 66 | 67 | 64 | 66 | 66 |
| Heat aging resistance (190° C. × 288 hrs) | Tensile stress at 100% elongation | MPa | 8.0 | 6.7 | 8.3 | 7.8 | 7.5 | 7.8 | 8.1 |
|  | Tensile strength | MPa | 10.3 | 10.6 | 10.8 | 9.4 | 8.7 | 9.9 | 10.4 |
|  | Elongation at break | % | 147 | 169 | 150 | 103 | 186 | 98 | 106 |
|  | Hardness |  | 78 | 77 | 79 | 78 | 74 | 79 | 85 |
|  | Residual ratio (tensile strength) | % | 72 | 80 | 74 | 73 | 93 | 75 | 76 |
|  | Residual ratio (elongation at break) | % | 53 | 70 | 56 | 37 | 61 | 36 | 39 |
|  | Change in hardness |  | +13 | +11 | +13 | +11 | +10 | +13 | +19 |
| Cold resistance |  | ° C. | −18 | −18 | −22 | −20 | −19 | −23 | −18 |

TABLE 2

|  |  |  | Ex. 8 | Ex. 9 | Ex. 10 | Ex. 11 | Ex. 12 | Ex. 13 | Ex. 14 |
|---|---|---|---|---|---|---|---|---|---|
| Methyl acrylate |  | Parts by mass | 0.0 | 0.0 | 33.3 | 18.8 | 31.3 | 0.0 | 0.0 |
| Ethyl acrylate |  | Parts by mass | 0.0 | 77.8 | 0.0 | 0.0 | 0.0 | 61.1 | 61.1 |
| n-Butyl acrylate |  | Parts by mass | 100.0 | 22.2 | 66.7 | 81.3 | 68.8 | 38.9 | 38.9 |
| Methyl methacrylate |  | Parts by mass | 0.0 | 0.0 | 11.1 | 0.0 | 0.0 | 11.1 | 11.1 |
| Ethyl methacrylate |  | Parts by mass | 0.0 | 0.0 | 0.0 | 25.0 | 0.0 | 0.0 | 0.0 |
| n-Butyl methacrylate |  | Parts by mass | 72.4 | 11.1 | 0.0 | 0.0 | 25.0 | 0.0 | 0.0 |
| Ethylene |  | Parts by mass | 0.0 | 5.6 | 0.0 | 0.0 | 0.0 | 8.9 | 11.1 |
| Glycidyl methacrylate |  | Parts by mass | 1.9 | 1.2 | 1.2 | 1.4 | 1.4 | 1.2 | 1.2 |
| Acrylic rubber |  |  | 100 | 100 | 100 | 100 | 100 | 100 | 100 |
| Stearic acid |  |  | 1 | 1 | 1 | 1 | 1 | 1 | 1 |
| Naugard 445 |  |  | 1 | 1 | 1 | 1 | 1 | 1 | 1 |
| SEAST #116 |  |  | 50 | 50 | 50 | 50 | 50 | 50 | 50 |
| Liquid paraffin |  |  | 1 | 1 | 1 | 1 | 1 | 1 | 1 |
| Trimethylthiourea |  |  | 0.5 | 0.5 | 0.5 | 0.5 | 0.5 | 0.5 | 0.5 |
| 1-Benzyl-2-methylimidazole |  |  | 1.6 | 1.6 | 1.6 | 1.6 | 1.6 | 1.6 | 1.6 |
| Octadecyltrimethyl ammonium bromide |  |  | 0.5 | 0.5 | 0.5 | 0.5 | 0.5 | 0.5 | 0.5 |
| Normal state physical properties Secondary vulcanized product | Tensile stress at 100% elongation | MPa | 3.6 | 4.2 | 5.5 | 5.1 | 6.7 | 4.4 | 4.7 |
|  | Tensile strength | MPa | 10.1 | 14.0 | 13.5 | 12.9 | 13.3 | 14.5 | 14.7 |
|  | Elongation at break | % | 255 | 261 | 226 | 240 | 258 | 267 | 254 |
|  | Hardness |  | 68 | 65 | 70 | 69 | 68 | 66 | 65 |
| Heat aging resistance (190° C. × 288 hrs) | Tensile stress at 100% elongation | MPa | 6.4 | 8.3 | 9.8 | 8.4 | 11.3 | 8.3 | 8.3 |
|  | Tensile strength | MPa | 7.9 | 10.6 | 12.0 | 12.4 | 12.5 | 10.8 | 10.8 |
|  | Elongation at break | % | 110 | 100 | 90 | 85 | 104 | 140 | 128 |
|  | Hardness |  | 83 | 87 | 86 | 87 | 86 | 80 | 81 |
|  | Residual ratio (tensile strength) | % | 78 | 76 | 89 | 96 | 94 | 74 | 73 |
|  | Residual ratio (elongation at break) | % | 43 | 38 | 40 | 35 | 40 | 52 | 50 |
|  | Change in hardness |  | +15 | +22 | +16 | +18 | +18 | +14 | +16 |
| Cold resistance |  | ° C. | −18 | −20 | −19 | −18 | −19 | −25 | −27 |

TABLE 3

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Methyl acrylate | Parts by mass | 0.0 | 0.0 | 0.0 | 0.0 | 0.0 | 0.0 |
| Ethyl acrylate | Parts by mass | 70.0 | 50.0 | 0.0 | 0.0 | 61.1 | 61.1 |
| n-Butyl acrylate | Parts by mass | 30.0 | 50.0 | 100.0 | 100.0 | 38.9 | 38.9 |
| Methyl methacrylate | Parts by mass | 0.0 | 0.0 | 122.2 | 9.1 | 11.1 | 11.1 |
| Ethyl methacrylate | Parts by mass | 0.0 | 0.0 | 0.0 | 0.0 | 0.0 | 0.0 |
| n-Butyl methacrylate | Parts by mass | 0.0 | 0.0 | 0.0 | 0.0 | 0.0 | 0.0 |
| Ethylene | Parts by mass | 0.0 | 0.0 | 0.0 | 0.0 | 0.0 | 0.0 |
| Glycidyl methacrylate | Parts by mass | 1.1 | 1.1 | 2.4 | 1.2 | 4.4 | 0.3 |
| Acrylic rubber |  | 100 | 100 | 100 | 100 | 100 | 100 |
| Stearic acid |  | 1 | 1 | 1 | 1 | 1 | 1 |
| Naugard 445 |  | 1 | 1 | 1 | 1 | 1 | 1 |
| SEAST #116 |  | 50 | 50 | 50 | 50 | 50 | 50 |
| Liquid paraffin |  | 1 | 1 | 1 | 1 | 1 | 1 |
| Trimethylthiourea |  | 0.5 | 0.5 | 0.5 | 0.5 | 0.5 | 1 |
| 1-Benzyl-2-methylimidazole |  | 1.6 | 1.6 | 1.6 | 1.6 | 1.6 | 1.6 |
| Octadecyltrimethyl ammonium bromide |  | 0.5 | 0.5 | 0.5 | 0.5 | 0.5 | 0.5 |
| Normal state physical properties Secondary vulcanized product | Tensile stress at 100% elongation MPa | 4.5 | 3.2 | 7.1 | 2.1 | 4.7 | Not vulcanized |
|  | Tensile strength MPa | 13.4 | 12.1 | 15.4 | 6.1 | 14.3 |  |
|  | Elongation at break % | 280 | 319 | 80 | 450 | 208 |  |
|  | Hardness | 64 | 64 | 78 | 63 | 65 |  |
| Heat aging resistance (190° C. × 288 hrs) | Tensile stress at 100% elongation MPa | 6.5 | 6.5 | Cured | 2.2 | Cured |  |
|  | Tensile strength MPa | 9.8 | 6.9 |  | 3.6 |  |  |
|  | Elongation at break % | 12 | 30 |  | 200 |  |  |
|  | Hardness | 91 | 90 |  | 78 |  |  |
|  | Residual ratio (tensile strength) % | 73 | 57 |  | 59 |  |  |
|  | Residual ratio (elongation at break) % | 4 | 9 |  | 44 |  |  |
|  | Change in hardness | +27 | +26 |  | +15 |  |  |
| Cold resistance | ° C. | −25 | −27 | −25 | −36 | −18 | −18 |

On comparison between Examples and Comparative Examples, the vulcanized product of the acrylic rubber composition of the present invention is found to be excellent in heat aging resistance, especially the residual ratio of tensile strength and the residual ratio of elongation at break after heat aging.

INDUSTRIAL APPLICABILITY

The vulcanized product obtainable from the acrylic rubber composition of the present invention can suitably be used as e.g. a hose article, a sealing article or a rubber vibration insulator since the heat aging resistance is good, especially the change in the residual ratio of tensile strength and the residual ratio of elongation at break is small.

The entire disclosure of Japanese Patent Application No. 2008-024836 filed on Feb. 5, 2008 including specification, claims and summary is incorporated herein by reference in its entirety.

The invention claimed is:

1. An acrylic rubber copolymer comprising:
(A) 100 parts by mass of an alkyl acrylate component comprising n-butyl acrylate and at least one selected from the group consisting of methyl acrylate and ethyl acrylate, wherein the n-butyl acrylate is present in an amount from 22.2 to 81.3 parts by mass;
(B) 10 to 100 parts by mass of an alkyl methacrylate component comprising at least one compound selected from the group consisting of methyl methacrylate, ethyl methacrylate, and n-butyl methacrylate, per 100 parts by mass of the alkyl acrylate (A); and
(C) 0.5 to 4 parts by mass of a crosslinkable monomer component comprising at least one selected from the group consisting of glycidyl methacrylate and monobutyl butenoate, per 100 parts by mass of the alkyl acrylate (A).

2. The acrylic rubber copolymer of claim 1, wherein the alkyl acrylate component (A) comprises methyl acrylate.

3. The acrylic rubber copolymer of claim 1, wherein the crosslinkable monomer (C) comprises glycidyl methacrylate.

4. The acrylic rubber copolymer of claim 1, wherein the crosslinkable monomer (C) comprises monobutenoate.

5. The acrylic rubber copolymer of claim 1, further comprising ethylene wherein the ethylene is present in an amount of at most 10 parts by mass, per 100 parts by mass of the alkyl acrylate (A).

6. An acrylic rubber composition comprising the acrylic rubber copolymer of claim 1; and at least one additive selected from the group consisting of a vulcanizer, a vulcanizing accelerator, a bulking agent, a reinforcing agent, a plasticizer, a lubricant, an antioxidant, a stabilizer, and a silane coupling agent.

7. A vulcanized product, obtainable by vulcanizing the acrylic rubber composition of claim 6.

8. A hose article, comprising the vulcanized product of claim 7.

9. A sealing article, comprising the vulcanized product of claim 7.

10. A rubber vibration insulator, comprising the vulcanized product of claim 7.

11. The acrylic rubber copolymer of claim 1, wherein the alkyl acrylate component (A) comprises ethyl acrylate.

12. The acrylic rubber copolymer of claim 11, wherein the alkyl acrylate component (A) comprises from 25.0 to 77.8 parts by mass of ethyl acrylate.

13. The acrylic rubber copolymer of claim 12, wherein the alkyl acrylate component (A) comprises from 22.2 to 75.0 parts by mass of n-butyl acrylate.

14. The acrylic rubber copolymer of claim 2, wherein the alkyl acrylate component (A) comprises from 18.8 to 33.3 parts by mass of methyl acrylate.

15. The acrylic rubber copolymer of claim 2, wherein the alkyl acrylate component (A) comprises from 66.7 to 81.3 parts by mass of n-butyl acrylate.

16. The acrylic rubber copolymer of claim 3, wherein the amount of the alkyl methacrylate component (B) is present in an amount of from 10 to 80 parts by mass per 100 parts by mass of the alkyl acrylate (A).

* * * * *